United States Patent [19]

Ikeda

[11] 4,305,483
[45] Dec. 15, 1981

[54] SLIDING CALIPER DISC BRAKE

[75] Inventor: Mitsuo Ikeda, Chiryu, Japan

[73] Assignee: Aisin Seiki Kabushiki Kaisha, Kariya, Japan

[21] Appl. No.: 76,647

[22] Filed: Sep. 18, 1979

[30] Foreign Application Priority Data

Sep. 9, 1978 [JP] Japan .................................. 53-12716
Sep. 19, 1978 [JP] Japan ................................ 53-114765

[51] Int. Cl.³ ............................................. F16D 65/02
[52] U.S. Cl. ..................................... 188/73.39; 188/73.45
[58] Field of Search ...................... 188/71.1, 73.3, 72.4

[56] References Cited

U.S. PATENT DOCUMENTS

| 3,166,159 | 1/1965 | Burnett | 188/73.3 |
| 3,682,277 | 8/1972 | Brown | 188/73.3 |
| 4,074,795 | 2/1978 | Kondo et al. | 188/73.3 |
| 4,121,698 | 10/1978 | Baum | 188/73.3 |

FOREIGN PATENT DOCUMENTS 2836589  3/1980  Fed. Rep. of Germany ..... 188/73.3

Primary Examiner—Edward R. Kazenske
Attorney, Agent, or Firm—Sughrue, Mion, Zinn, Macpeak and Seas

[57] ABSTRACT

A sliding caliper disc brake is comprised of a C-shaped caliper having a fluid operated piston in one limb thereof for simultaneous application of friction pads to opposed surfaces of a rotating disc. The caliper is slidably mounted on two spaced apart arms of a support member by means of a pair of support pins slidably mounted in bores located in the arms of the support member. One end of each support pin is provided with a connection to the caliper which will permit lateral movement of the pin relative to the caliper. The connection may be comprised of a laterally extending connecting pin slidably mounted in the caliper. The connecting pin may be pivoted to, fixed to or of one-piece with the support pin. An additional connecting pin may be provided at the opposite end of each support pin for a heavy-duty brake.

6 Claims, 9 Drawing Figures

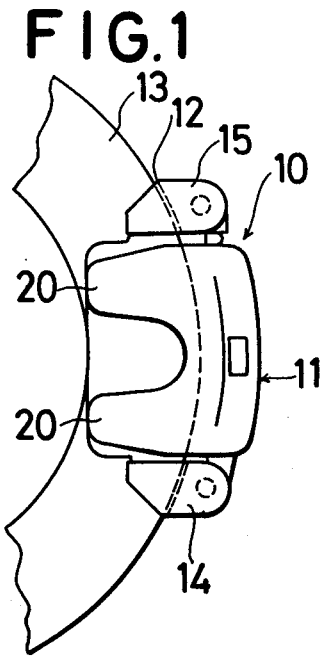
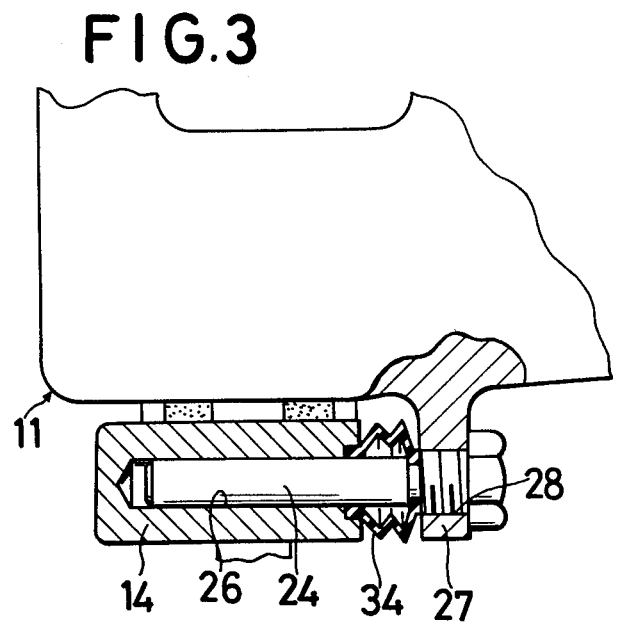
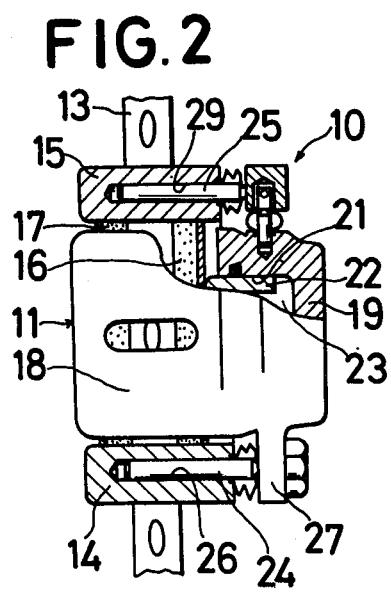
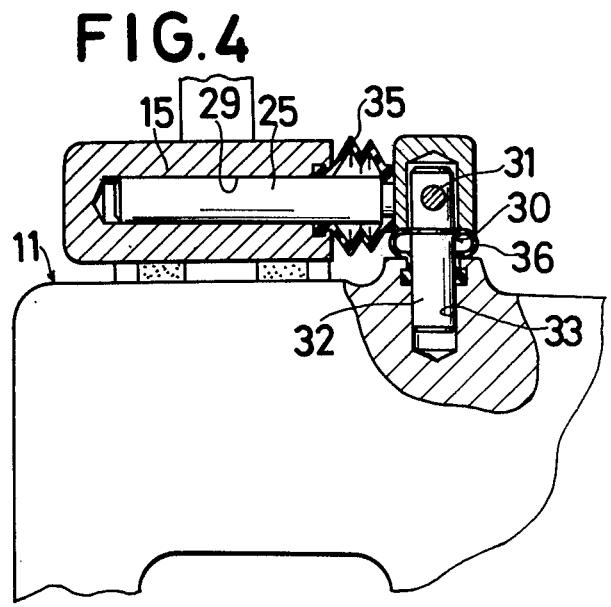

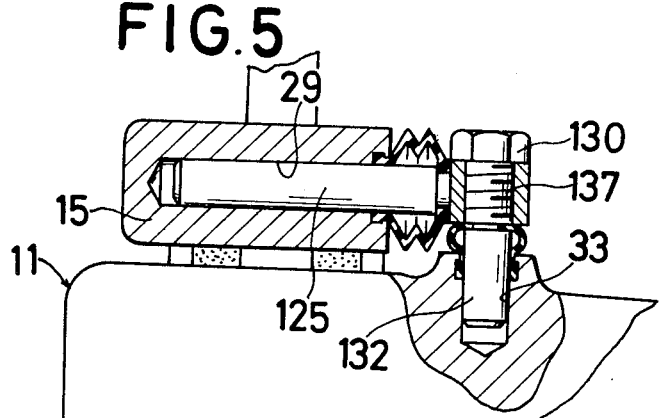
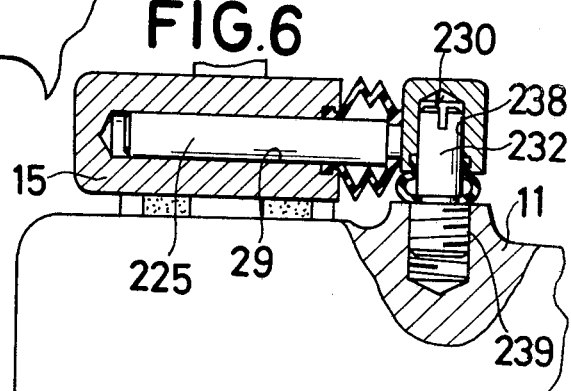
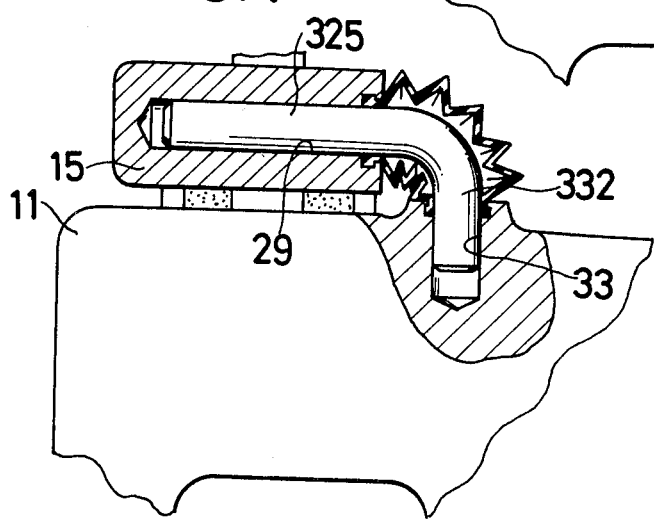

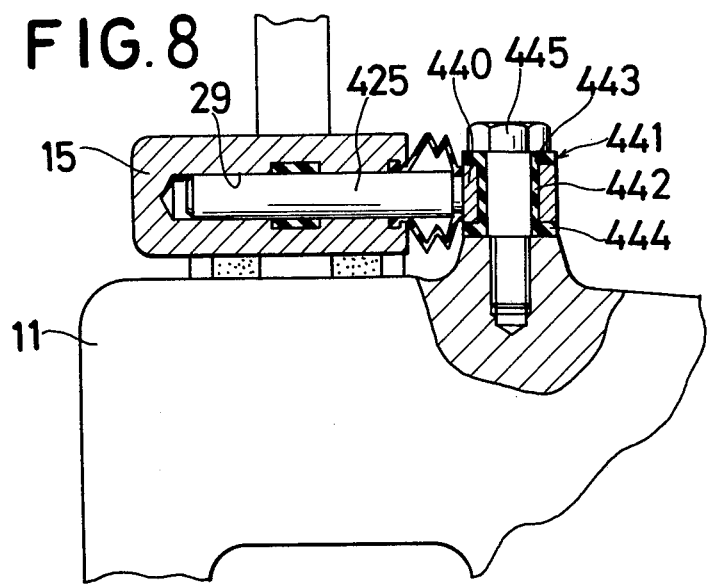
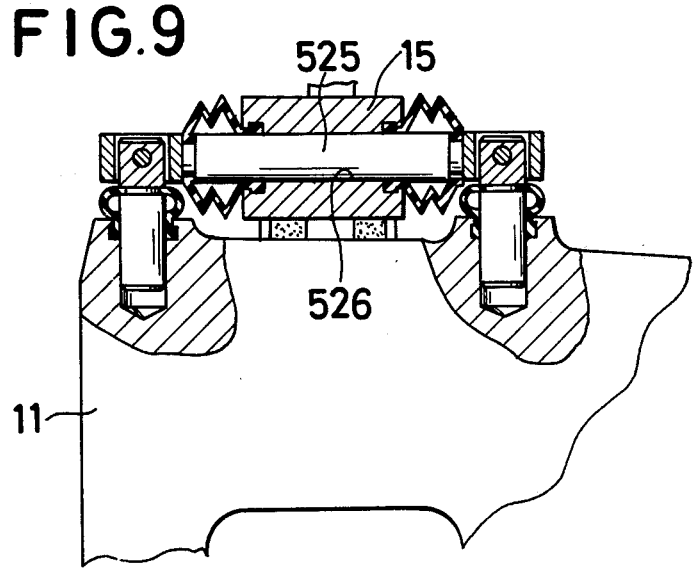

SLIDING CALIPER DISC BRAKE

BACKGROUND OF THE INVENTION

1. Field of the Invention

The present invention relates to sliding caliper disc brakes of the type in which a caliper member, which is slidably mounted on a torque member and straddles a minor portion of the periphery of a rotatable disc, includes an actuator for directly urging a friction pad into engagement with one side of the disc whereupon the caliper member slides relative to the torque member and applies by reaction an opposite pad to the other side of the disc. More specifically, the present invention relates to a sliding pin arrangement between the caliper and the torque member.

2. Description of the Prior Art

When a sliding connection between a caliper member and a torque member is provided by a pair of supporting pins fixed to the caliper member and slidable in openings in the torque member, increased resistance to sliding arising from corrosion and dirt may be avoided by sealing the sliding surfaces of the supporting pins and their openings. However, it is important to ensure that the pins and openings are accurately aligned and parallel. Any appreciable deviation, which will typically be on the order of inaccuracies expected in mass-production manufacture, will affect the ease with which the caliper member will slide on the torque member resulting in uneven braking when, for example, two nominally indentical brakes with different sliding characteristics are mounted at the front wheels of a vehicle. An additional problem arises during heavy braking from deflection of the torque member resulting in objectionable misalignment between the pins and openings.

The U.S. Pat. No. 4,094,389 to Brix et al granted June 13, 1978 shows a typical arrangement for slidably supporting a caliper for axial movement relative to a support member. A pair of pins 20 are secured to the caliper and are slidably disposed in parallel bores formed in the fixed support.

The U.S. Pat. No. 4,074,795 to Kondo granted Feb. 21, 1978 slidably supports the caliper on the support member by a pair of parallel pins secured to the arms of the support member and extending into a pair of oversized bores on the caliper. Deformable resilient spacers are located within the bores in sliding relation to the pins to accommodate minor misalignments.

The U.S. Pat. No. 4,061,209 to Gee et al granted Dec. 6, 1977 discloses a disc brake wherein the caliper is mounted for axial sliding movement relative to the support by means of a pair of parallel pins rigidly secured to opposite side of the caliper and disposed in oversized bores in the support member. A spring member is provided to normally bias the pins into an eccentric position in direct sliding contact with the wall of the respective bore to prevent rattling while allowing deformation of the support during braking without unduly binding the pins within the bores.

SUMMARY OF THE INVENTION

The present invention provides a new and improved sliding caliper disc brake which solves the above problems associated with prior art constructions.

The present invention provides a sliding caliper disc brake having an improved connection between at least one of the supporting pins and a caliper member so as to permit relative movement therebetween in the lateral of circumferential direction.

The present invention provides a new and improved sliding caliper disc brake wherein a pair of support pins for the caliper are slidally mounted in bores formed in the fixed support. The support pins are provided with a connection at one end thereof to the caliper so as to permit lateral or circumferential movement of the pins relative to the caliper. The connection may be comprised of a pin orthogonally disposed relative to the supporting pin for relative sliding movement between the said one end of the supporting pin and the caliper. A similar connection may be provided between the opposite end of the supporting pin and the caliper in a heavy-duty brake construction.

The foregoing and other objects, features and advantages of the present invention will become apparent from the following description taken in connection with the accompanying drawings.

BRIEF DESCRIPTION OF THE DRAWINGS

FIG. 1 is a partial side elevation view of one embodiment of a sliding caliper disc brake according to the present invention;

FIG. 2 is a plan view partly in section of the sliding caliper disc brake of FIG. 1;

FIG. 3 is an enlarged view of a portion of the brake of FIG. 2 showing the arrangement of one supporting pin;

FIG. 4 is an enlarged view of a portion of the brake of FIG. 2 showing the arrangement of the other supporting pin; and FIGS. 5 to 9 are views similar to FIG. 4, but showing various modifications relative to the arrangement of the other supporting pin.

DETAILED DESCRIPTION OF THE INVENTION

Referring to FIGS. 1 to 4, there is shown a first embodiment of a sliding caliper disc brake according to the present invention. The sliding caliper disc brake 10 comprises a caliper member 11 slidably mounted on a torque member 12 so as to straddle a minor portion of the periphery of a rotatable disc 13. The torque member 12 is fixed to a stationary part of a vehicle, and the rotatable disc 13 is fixed to a wheel of the vehicle. A pair of arms 14 and 15 of the torque member 12 extend over the disc 13 and support inner and outer pads 16 and 17 for sliding movement relative thereto. The drag forces experienced by the pads 16 and 17 when the brake is applied are transmitted directly to one or the other of the arms 14 and 15 depending upon the direction of disc rotation.

The caliper member 11 comprises a bridge portion 18 carrying inner and outer radially inwardly extending limb portions 19 and 20. The inner limb portion 19 is provided with a cylinder 21 in which is piston 22 is slidable. A chamber 23 defined in the cylinder 21 by the piston 22 communicates with a feed port, not shown, provided in the limb portion 19. The piston 22 engages the back plate of the pad 16 and the outer limb portion 20 of the caliper member 10 engages the back plate of the outer pad 17.

When hydraulic fluid under pressure is admitted in the chamber 23 by way of feed port, the piston 22 is displaced outwardly of the cylinder 21 and applies the pad 16, which is accordingly known as the directly actuated pad, against an inner surface of the disc 13. The caliper 11 is thereby caused to slide inwardly with respect to the torque member 12 to apply the pad 17 to an outer surface of the disc 13.

The sliding connection between the caliper member 11 and the torque member 12 comprises a pair of supporting pins 24 and 25 which are parallel relative to the axis of rotation of the disc 13. The supporting pin 24 is slidably received in an opening 26 provided in the arm 14 of the torque member 12 and is fixed to a laterally extending projection 27 of the caliper member 11 by screw-threaded engagement 28. The other supporting pin 25 is slidably received in an opening 29 provided in the arm 15 of the torque member 12 and is connected at one end thereof to a connecting member 30 by a pivot-pin 31. The connecting member 30 includes a laterally extending pin-portion 32 which is slidably received in an opening 33 provided in the caliper member 11. The sliding surfaces of the supporting pin 24 and opening 26 are sealed against the ingress of dirt and moisture by a flexible sealing boot 34. Similarly, the sliding surfaces of the supporting pin 25 and opening 29 are sealed by a flexible sealing boot 35 and the sliding surfaces of the pin-portion 32 of the connecting member 30 and opening 33 are sealed by a flexible sealing boot 36.

During assembly of the brake, any misalignment appearing between the openings 26, 29 and supporting pins 24, 25, respectively, can be accommodated by lateral movement of the connecting member 30 in the opening 33 of the caliper member 11. During braking, the spreading between the arms 14 and 15 of the torque member 12 as a result of drag on the pads 16 and 17 is accommodated by lateral movement of the connecting member 30 relative to the caliper member 11. In addition, any skewing of the arms 14 and 15 of the torque member 12 as a result of drag on the pads 16 and 17 during braking which results in non-parallel pins 24 and 25 is accommoated by pivotal movement of the connecting member 30 relative to supporting pin 25.

It should be noted that the connection between the supporting pin 25 and the caliper member 11 may be adapted also to the connection between the supporting pin 24 and the caliper member 11.

Referring to FIGS. 5 to 9, there are shown various other modifications relative to the connection between the supporting pin and the caliper member.

In FIG. 5, a supporting pin 125 slidable received in the opening 29 in the arm 15 of the torque member 12 and a connecting member 130 including a laterally extending pin-portion 132 slidable received in the opening 33 in the caliper member 11, are fixed to each other by screw-threaded engagement 137.

In FIG. 6, a supporting pin 225 slidably received in the opening 29 in the arm 15 of the torque member 12 is provided at one end thereof with a head having an opening 238 which slidably receives a laterally extending pin-portion 232 of a connecting member 230 fixed to the caliper member 11 by screw threaded engagement 239.

In FIG. 7, a supporting pin 325 slidably received in the opening 29 in the arm 15 of the torque member is integrally provided with a laterally extending pin-portion 332 slidably received in the opening 33 in the caliper member 11.

In FIG. 8, a supporting pin 425 slidably received in the opening 29 in the arm 15 of the torque member is provided at one end thereof with an eye-portion 440. The eye-portion 440 is provided with a resilient bush 441 which includes a tubular portion 442 positioned in the eye-portion 440 and a pair of flanges 443 and 444 positioned at sides of the eye-portion 440. A bolt 445 passing through an inner bore of the bush 441 fixes the supporting pin 425 to the caliper member 11. The resiliency of the flanges 443 and 444 of the bush 441 permit lateral movement of the supporting pin 425 relative to the caliper member 11, and the resiliencies of the tubular portion 441 and the flanges 443 and 444 permit the angular movement of the pin 425 relative to the caliper member 11 and the other supporting pin. It should be noted that the flange 444 of the bush 441 may be omitted when the pitch between the openings in the arms of the torque member is accurately maintained above a predetermined value during manufacturing.

In FIG. 9, a supporting pin 525 passes through an opening 526 in the arm 15 of the torque member and is connected at both ends thereof to the caliper member 11 by connections substantially similar to FIG. 4. This arrangement is suitable for a large size brake.

Flexible sealing boots may be provided about the various pins shown in the embodiments of FIGS. 5–9 inclusive.

Obviously, many modifications and variations of the present invention are possible in light of the above. It is, therefore, to be understood that within the scope of the appended claims, the invention may be practicable otherwise than as specifically described herein.

What is claimed is:

1. A sliding caliper disc brake comprising,
   a torque member,
   a caliper member slidably mounted on said torque member for straddling a minor portion of the periphery of a rotatable disc,
   a pair of friction pads movably supported by said torque member for disposition on opposite sides of said disc, and
   an actuator for directly urging a friction pad against one side of said disc to cause said caliper member to slide relative to said torque member to apply by reaction an opposite friction pad onto the other side of said disc;
   said caliper member being slidably mounted on the torque member by a sliding connection which includes a supporting pin having a portion slidably received in an opening in said torque member, and
   said supporting pin being connected to said caliper member by slidable connecting means to permit the lateral movement of said supporting pin relative to said caliper member;
   said slidable connecting means comprising two opposed bores located in said connecting pin and said caliper member, a connecting member including a pin portion having a longitudinal axis disposed substantially perpendicular to said supporting pin and means connecting said connecting member in one of said bores with said pin portion being disposed for axial sliding movement in the other of said bores.

2. A sliding caliper disc brake according to claim 1, wherein said connecting member is connected to said supporting pin with said pin-portion slidably received in said bore in said caliper member.

3. A sliding caliper disc brake according to claim 2, wherein said connecting member is pivotally connected to said supporting pin.

4. A sliding caliper disc brake according to claim 2, wherein said connecting member is fixed to said supporting pin.

5. A sliding caliper disc brake according to claim 1, wherein said connecting member is fixed to said caliper member with said pin-portion slidably received in said bore in said supporting pin.

6. A sliding caliper disc brake according to claim 1 further comprising protective boot means to cover the exposed portions of said supporting pin and the pin portions of said connecting member.

* * * * *